United States Patent
Kato et al.

[11] Patent Number: 5,882,182
[45] Date of Patent: Mar. 16, 1999

[54] HIGH-TEMPERATURE MOTOR PUMP AND METHOD FOR OPERATING THEREOF

[75] Inventors: Hiroyuki Kato, Yokohama; Shuichiro Honda, Kawasaki, both of Japan

[73] Assignee: Ebara Corporation, Tokyo, Japan

[21] Appl. No.: 819,939

[22] Filed: Mar. 18, 1997

[30] Foreign Application Priority Data

Mar. 18, 1996  [JP]  Japan .................................. 8-088737

[51] Int. Cl.[6] .................................................. F04B 39/06
[52] U.S. Cl. ........................ 417/366; 417/228; 417/423.8
[58] Field of Search ................................... 417/228, 366, 417/372, 423.8

[56] References Cited

U.S. PATENT DOCUMENTS

| | | | |
|---|---|---|---|
| 4,545,333 | 10/1985 | Nagumo et al. | 123/41.02 |
| 4,614,482 | 9/1986 | Gaffal . | |
| 4,645,429 | 2/1987 | Asami et al. | 417/366 |
| 4,808,087 | 2/1989 | Tsutsui et al. | 417/372 |
| 5,129,795 | 7/1992 | Hyland . | |
| 5,221,191 | 6/1993 | Leyderman et al. | 417/372 |

FOREIGN PATENT DOCUMENTS

| | | |
|---|---|---|
| 40 09 198 | 9/1991 | Germany . |
| 01174231 | 7/1989 | Japan . |
| 1-174231 | 7/1989 | Japan . |
| 6-249180 A | 9/1994 | Japan ....................... 417/372 |
| 1060-807-A | 12/1983 | U.S.S.R. ................ 417/228 |
| 1687857-A1 | 10/1991 | U.S.S.R. ................ 417/228 |

OTHER PUBLICATIONS

Patent Abstracts of Japan, vol. 013, No. 450 (E–830), 11 Oct. 1989.

Primary Examiner—Charles G. Freay
Assistant Examiner—Cheryl J. Tyler
Attorney, Agent, or Firm—Wenderoth, Lind & Ponack, L.L.P.

[57] ABSTRACT

A high-temperature motor pump is operated by a method wherein coolant is supplied in a manner to maintain the temperature thereof sufficiently high to keep its viscosity at a low level for smoothly flowing in a narrow gap between a rotor and a stator. Thus, the coolant performs a cooling function without frictional loss, and thereby the motor pump is stably operated with little energy loss.

26 Claims, 5 Drawing Sheets

F I G . 5
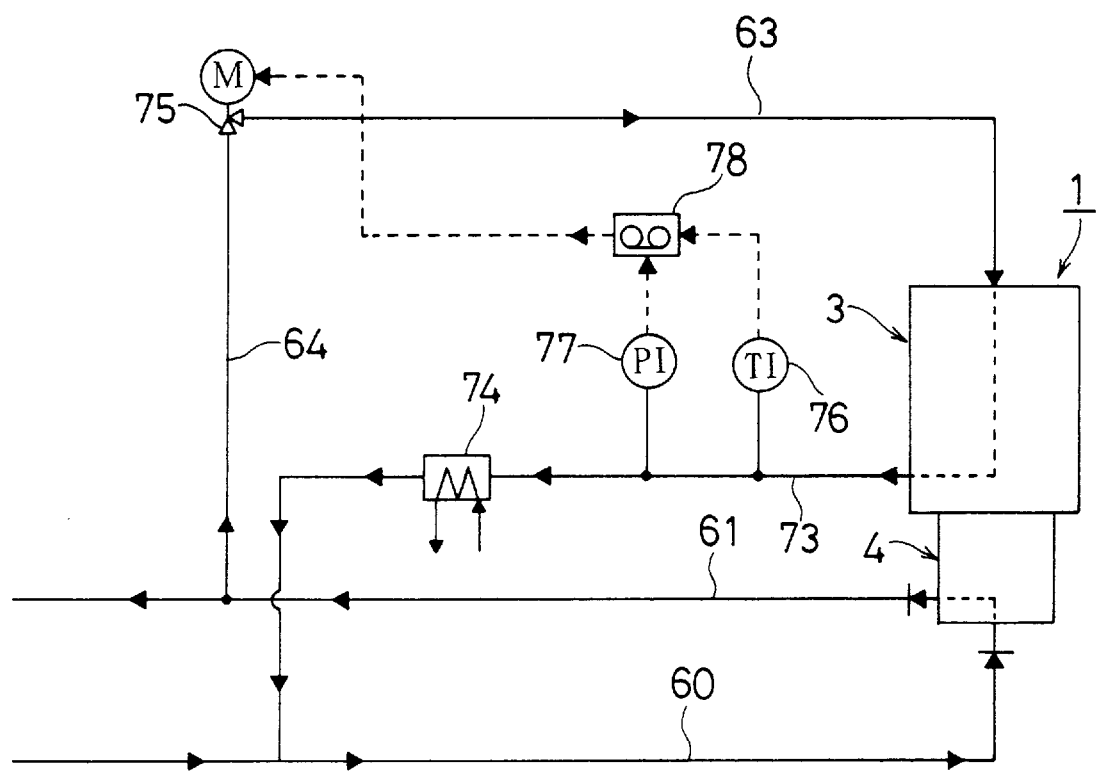

ns5,882,182

HIGH-TEMPERATURE MOTOR PUMP AND METHOD FOR OPERATING THEREOF

BACKGROUND OF THE INVENTION

1. Field of the Invention

The present invention relates to a high-temperature motor pump and a method of operating thereof, and more particularly to a high-temperature motor pump for pumping a high temperature liquid for use in a boiler system or a nuclear power plant and a method of operating thereof.

2. Description of the Related Art

A conventional high-temperature motor pump comprises a pump portion for pumping a high temperature liquid and a motor portion having a motor for driving the pump portion. These portions are housed in a liquid-tight chamber, and a coolant flow is provided in the motor portion for cooling the motor to pass through a narrow gap between a stator and a rotor.

One example of such a pump is disclosed in Japanese Laid-Open Patent Application No. 1-174231, in which a coolant is cooled by an external heat exchanger and introduced into the motor.

However, in the above motor pump, since the coolant flows through the narrow gap between a stator and a rotor in the motor to conduct cooling, if the coolant temperature is excessively low, a high viscosity of the coolant leads to a high friction loss.

SUMMARY OF THE INVENTION

It is therefore an object of the present invention to provide a high-temperature motor pump and a method of operating thereof, in which the coolant is maintained at a temperature high enough for flowing smoothly through narrow gaps in the motor portion to conduct cooling, thereby operating the motor pump stably with a low friction loss.

In order to achieve the above object, there is provided a method for operating a motor pump comprising a pump portion; a motor portion including a rotor and a stator for driving the pump portion by way of a common rotation shaft; and a casing for housing the pump portion and the motor portion. The method comprises the steps of: providing a coolant to a gap between the stator and the rotor; and controlling the temperature of the coolant in the gap at a temperature more than a predetermined temperature for maintaining the viscosity thereof suffient to prevent the frictional loss between the rotor and the stator.

In order to achieve the above object, there is also provided a high-temperature motor pump comprising: a pump portion for pumping a liquid; a motor portion for driving the pump portion, the motor portion including a rotor and a stator; a rotation shaft for transmitting rotation of the motor portion to the pump portion; a casing for housing the pump portion, the motor portion and the rotation shaft; a coolant passage formed within the casing to pass through a gap between the stator and the rotor for flowing a coolant therethrough; a temperature sensor for sensing temperature in the gap portion; and a controller for controlling the flow rate and/or the temperature of the coolant based on a signal of the temperature sensor.

According to the above invention, the coolant is maintained above a predetermined temperature to keep the viscosity of the coolant at a low level. As a result, the coolant can flow through the gap between the rotor and the stator in the motor portion at a higher speed so as to cool it more efficiently. Also, the energy loss at the gap due to friction of the coolant can be reduced so that the pumping efficiency can be improved.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a pipeline diagram of the high-temperature motor pump of FIG. 4.

DETAILED DESCRIPTION OF THE PREFERRED EMBODIMENT

Figure 1:
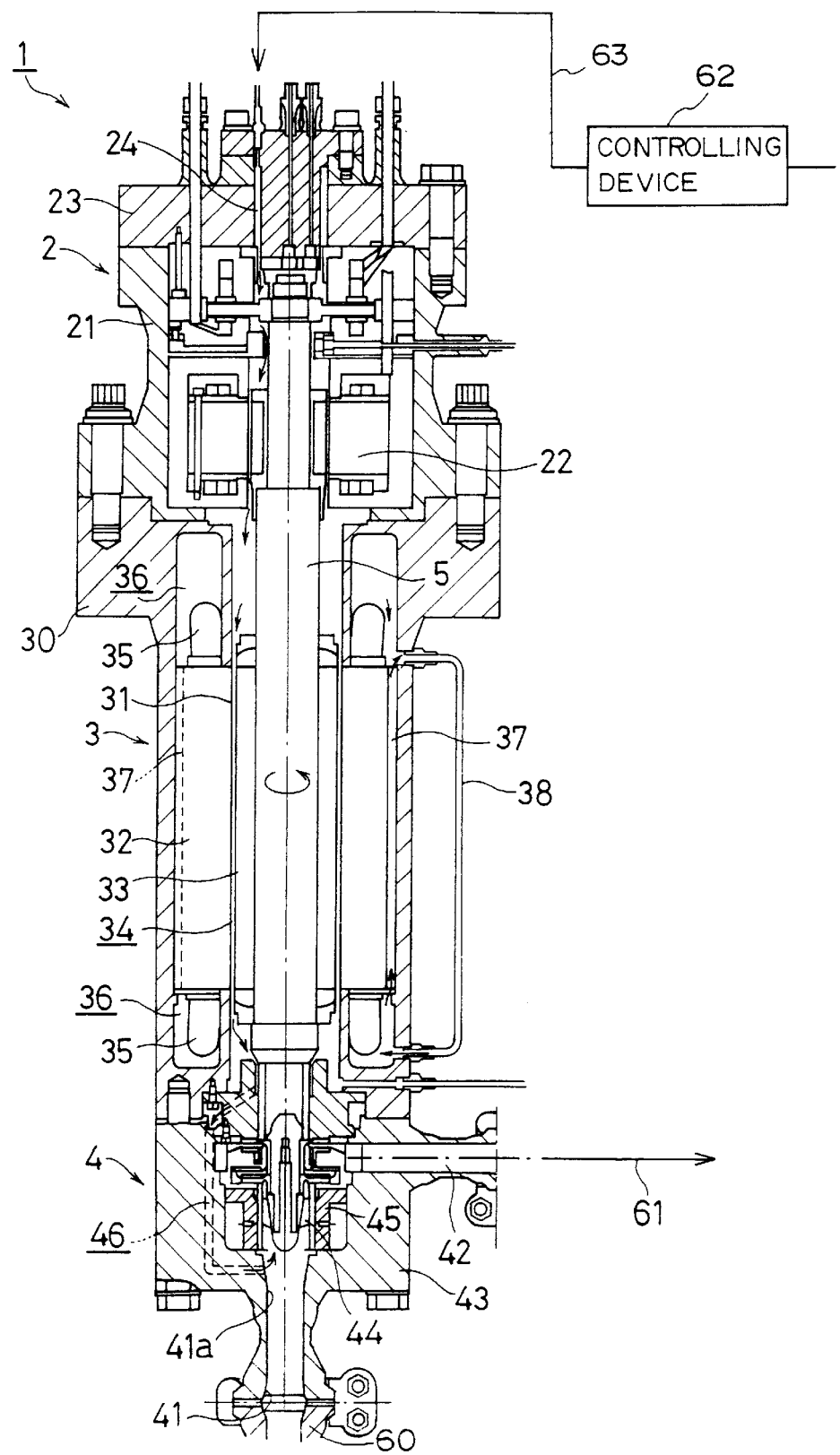
FIG. 1 is a vertical cross-sectional view showing a high-temperature motor pump of a first embodiment of the present invention.

Hereinafter, preferred embodiments of the present invention will be described in detail. In the following description, the same or similar features are denoted by the same reference numerals through the embodiments.

Figure 2:
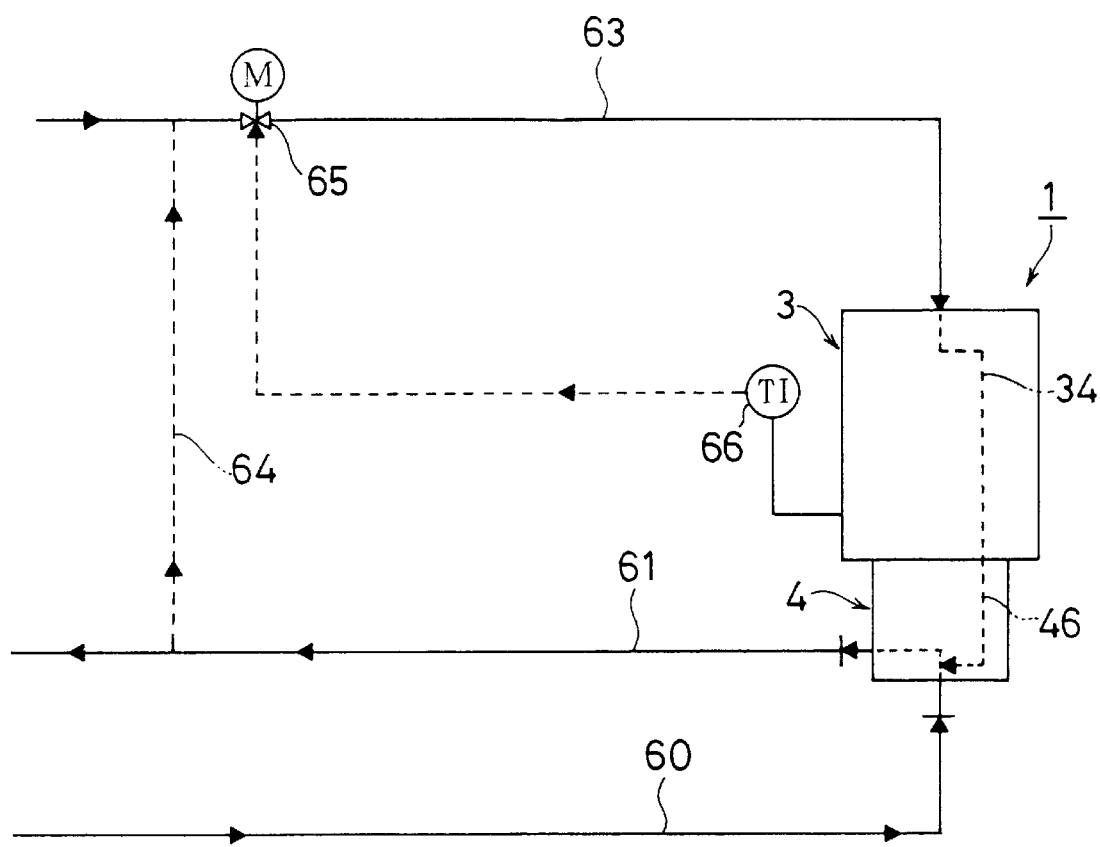
FIG. 2 is a pipeline diagram of the high-temperature motor pump of FIG. 1.

FIGS. 1 and 2 show a motor pump 1 of a first embodiment of the present invention. The motor pump 1 has a pump portion 4 for pumping a high temperature liquid, a motor portion 3 for driving the pump portion 4, a rotation shaft 5 common to motor portion 3 and pump portion 4, and a bearing portion 2 for supporting the rotation shaft 5. The bearing portion 2 has a bearing casing 21 having a cylindrical shape and a bearing 22 such as a magnetic bearing encased in the bearing casing 21.

The upper end of the bearing casing 21 is covered with a cover plate 23 in which a coolant passage 24 for introducing a coolant into the motor pump 1 is defined. The coolant thus introduced into the bearing casing 21 from the passage 24 flows inside the bearing 22 to cool and lubricate the bearing 22.

The motor portion 3 has a cylindrical motor casing 30 which is connected to a lower end of the bearing casing 21 through flanges. Inside the motor casing 30 is defined a substantially cylindrical stator housing portion 31 for housing a stator 32 therein. Inwardly of the stator 32, a rotor 33 is provided integral with the rotation shaft 5 for rotating it. Between the stator 32 and the rotor 33, a cylindrical gap 34 is defined.

The stator 32 comprises cores and coils 35. The coil 35 which protrudes from the edge of the core is housed in a coil chamber 36 which is a part of the stator housing portion 31. The motor casing 30 has an exterior pipe 38 for connecting top and bottom portions of the stator housing portion 31. The exterior pipe 38 forms a circulation passage for coolant together with a gap (internal flow passage) 37 between a wall of the stator housing portion 31 and the stator 32. The circulation passage is provided for cooling the coolant by an outer air by flowing the coolant to circulate as indicated by arrows through natural convection when the temperature difference between the inside and the outside of the motor casing 30 is at a certain level.

In the pump portion 4, a pump casing 43 is connected to the lower end of the motor casing 30. An inducer 44 connected to the lower end of the rotation shaft 5 is provided in the pump casing 43 and is rotatably supported by a bearing 45. An inlet 41 and an outlet 42 are provided to open at the bottom and a lateral side of the pump casing 43 respectively. Inside the pump casing 43 is formed an internal passage 46 connecting a space adjacent the rotation shaft 5 of the motor portion 3 to the inlet passage 41a above the pump inlet 41.

The motor pump 1 is usually used by placing the pump inlet 41 in a high temperature liquid or connecting it to an inlet line 60. The outlet 42 is connected to an outlet line 61 for discharging the pumped liquid therethrough. The passage 24 for introducing the coolant is connected to a coolant supply line 63 which has a controlling device 62. The controlling device 62 controls the temperature of the coolant in the gap 34 of the motor portion 3 by adjusting the flow rate and/or temperature of the coolant in the coolant supply line 63.

Hereinafter, several examples of the controlling device 62 will be described. FIG. 2 shows a first example of the controlling device 62, in which the temperature of the coolant in the gap 34 is controlled by adjusting the flow rate of the supplied coolant. The outlet line 61 of the pump is branched off into an auxiliary line 64, which is connected to the coolant supply line 63. By such a configuration, when the internal pressure of the pump outlet line 61 is sufficiently high, a part of the processed liquid can be utilized for cooling in addition to the coolant supplied from an outside source.

A flow adjustment valve 65 for adjusting the flow rate of the coolant in the coolant supply line 63 is provided on a downstream side of the merge point with the auxiliary line 64. In the gap 34 of the motor portion 3, a thermometer 66 for measuring the temperature of the liquid is provided. The controlling device 62 of this example compares the measured temperature of the liquid with a predetermined temperature, and transmits a signal to a valve driver (not shown) for driving the valve 65 so as to decrease the valve opening when the measured temperature is lower than the predetermined temperature, and to increase it when the temperature is higher than the predetermined temperature. Through such a process, the coolant flowing in the gap 34 is maintained at an appropriate high temperature.

In the foregoing, "an appropriate high temperature" means a temperature at which the motor portion 3 can operate and the kinematic viscosity coefficient of the coolant remains less than ⅓ of that at room temperature. TABLE 1 shows the variation of the kinematic viscosity coefficient of water and TABLE 2 shows the variation of the kinematic viscosity coefficient of an example of a heat transfer medium oil. In general, when the kinematic viscosity coefficient of the coolant is less than ⅓ of that at room temperature, the frictional loss at the gap 34 is negligible and the operational efficiency of the motor pump is fairly improved.

TABLE 1

(Pressure: 20 MPa)

| Temperature (°K.) | Temperature (°C.) | $v$ (mm$^2$/s) | $v_T/v_{300°\ K.}$ |
|---|---|---|---|
| 300 | 27 | 0.847 | 1.000 |
| 320 | 47 | 0.581 | 0.686 |
| 338 | 65 | 0.447 | 0.528 |
| 370 | 97 | 0.310 | 0.365 |
| 420 | 147 | 0.206 | 0.243 |

TABLE 1-continued (Pressure: 20 MPa)

| Temperature (°K.) | Temperature (°C.) | $v$ (mm$^2$/s) | $v_T/v_{300°\ K.}$ |
|---|---|---|---|
| 450 | 177 | 0.175 | 0.206 |
| 500 | 227 | 0.144 | 0.169 |
| 550 | 277 | 0.128 | 0.150 |
| 600 | 327 | 0.118 | 0.139 |

TABLE 2

| Temperature (°K.) | Temperature (°C.) | $v$ (mm$^2$/s) | $v_T/v_{293°\ K.}$ |
|---|---|---|---|
| 293 | 20 | 4.169 | 1.000 |
| 323 | 50 | 2.212 | 0.530 |
| 373 | 100 | 0.832 | 0.199 |
| 423 | 150 | 0.503 | 0.121 |
| 473 | 200 | 0.373 | 0.090 |
| 523 | 250 | 0.300 | 0.072 |
| 573 | 300 | 0.269 | 0.065 |
| 623 | 350 | 0.262 | 0.063 |
| 673 | 400 | 0.257 | 0.062 |

In the above tables, the kinematic viscosity coefficient $v$ at a temperature T generally is expressed as $v_T$. In a boiler circulation pump, water of 65° C. is generally used as a coolant. THe kinematiic viscosity coefficient at this temperature $v_{65°\ C.}$ is 0.447, as shown in TABLE 1. When the temperature is raised to 327° C., then the kinematic viscosity coefficient $v_{327°\ C.}$ is 0.118, which is less than 30% of $v_{65°\ C.}$.

According to the motor pump described above, the coolant is introduced from the passage 24 to the bearing portion 2, and flows into the gap 34 between the stator 32 and the rotor 33. There, the coolant temperature is raised by absorbing the heat generated in the stator 32 and the rotor 33. Then, the coolant flows through the internal passage 46 and merges with the fluid to be pumped at the inlet passage 41a. The fluid temperature changes in the process of heat exchange and frictional heating in the coolant passage including the gap 34.

The flow rate of the coolant is controlled by the controlling device 62 so that the temperature of the liquid in the gap 34 between the stator 32 and the rotor 33 becomes high enough to keep the kinematic viscosity coefficient less than ⅓ of that at room temperature. As a result, the frictional resistance resulting from the liquid is small and the energy loss of the motor pump 1 can be lowered.

As described above, the temperature of the liquid at the gap 34 is given as a summation of various temperature changes subjected to the liquid in the passage to the gap 34. When the temperature of the liquid is too low, another heat source may be required. When the temperature of the liquid is a little lower, the temperature thereof may be raised to a predetermined temperature in the passage to the gap 34. If the pump is for pumping the high temperature liquid, it is not necessary to provide an additional heat source to keep the coolant at the required temperature.

In this example, since the same liquid is used for a coolant as that handled by the pump, the coolant can be mixed into the liquid to result in a simple structure of the flow passage. However, the coolant may be of a different kind of liquid than the pumped liquid.

Figure 3:
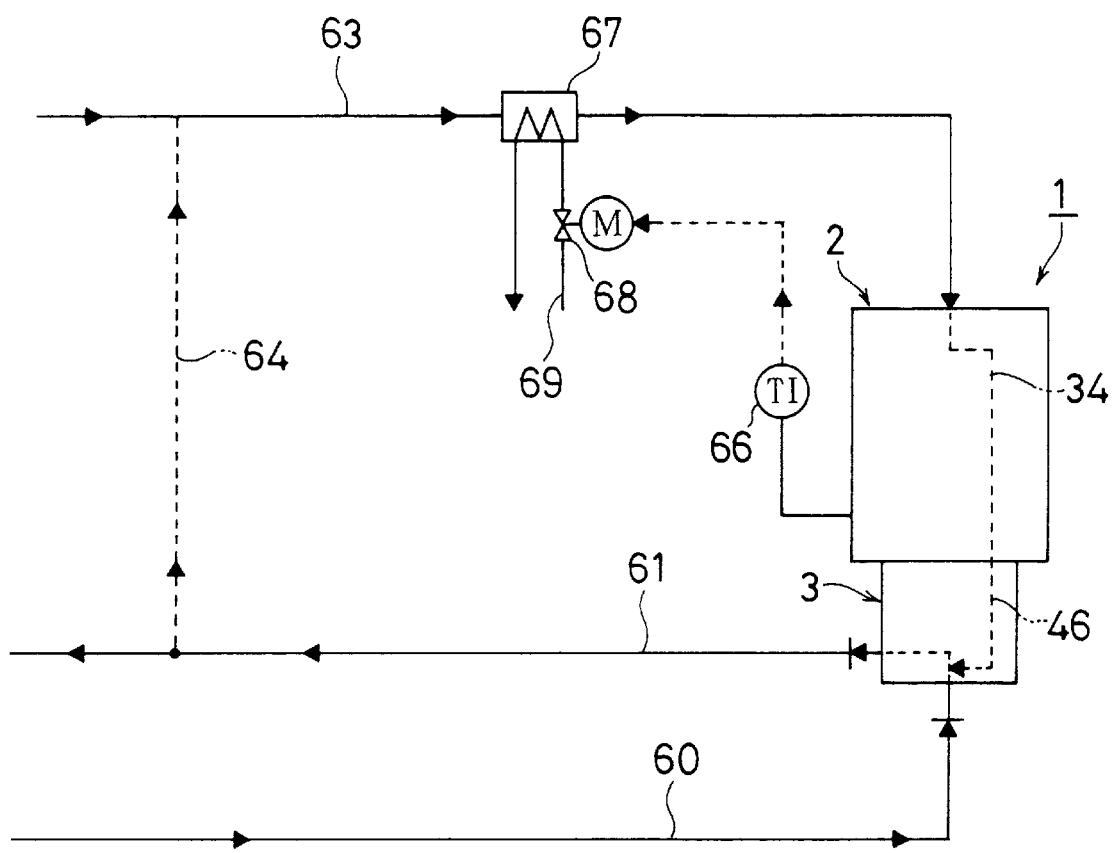
FIG. 3 is a pipeline diagram of another modified embodiment of the present invention.

FIG. 3 shows another example of the controlling device 62, in which the temperature of the coolant in the gap 34 is controlled by adjusting the temperature of the coolant supplied to the passage 24. In this example, a heat exchanger 67 having a heat exchange medium line 69 is provided in the coolant supply line 63. An automatic valve 68 is provided in the heat exchange medium line 69 for controlling the temperature of the coolant by adjusting the flow rate of a heat exchange medium supplied to the heat exchanger 67 in response to the signal transmitted from the thermometer 66. That is, when the temperature of the coolant in the gap is higher than the target temperature, the automatic valve 68 increases the opening, and when the temperature of the coolant in the gap is lower than the target temperature, the automatic valve 68 decreases the opening.

In this example also, the coolant may be supplied from the outer source, however, a part of or all of the coolant may be supplied from the pump through the auxiliary line 64 when the pressure of the pump outlet line is sufficiently high.

Figure 4:
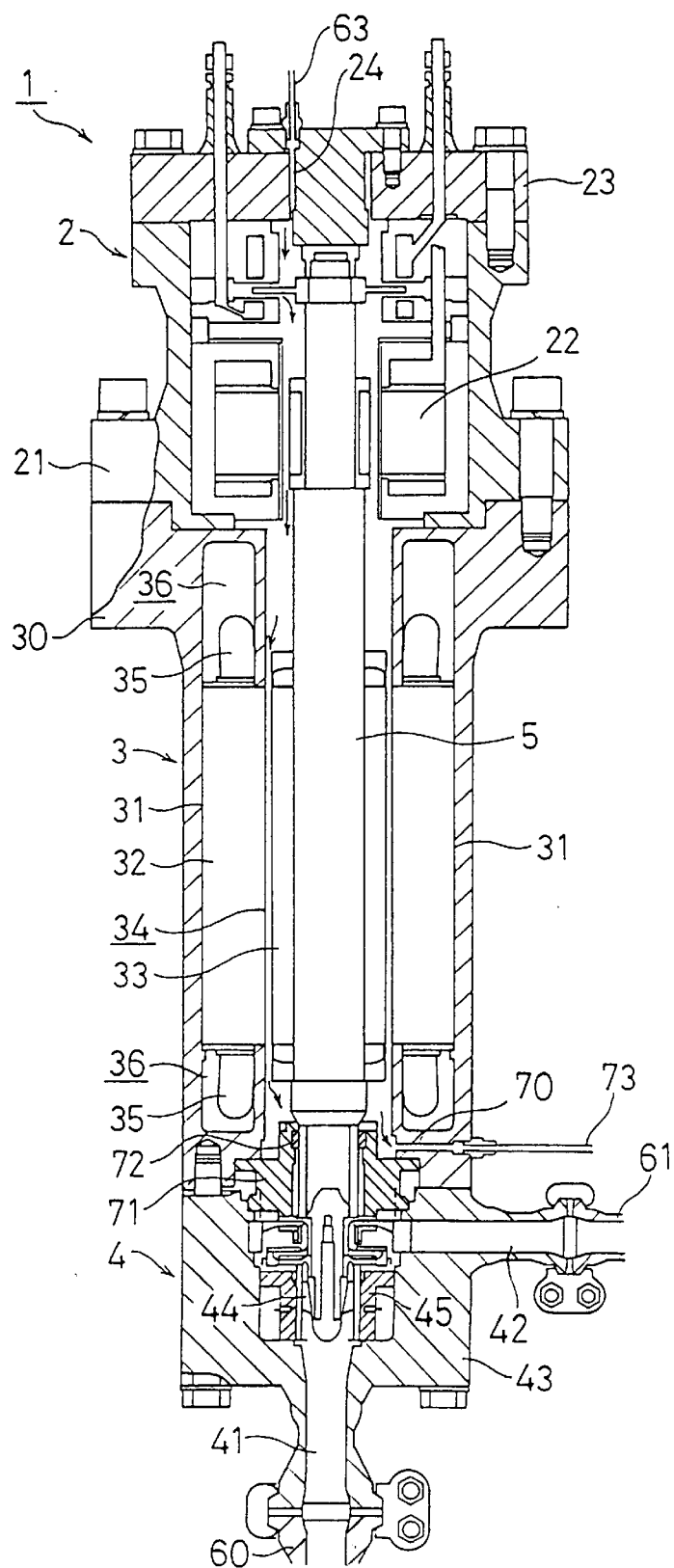
FIG. 4 is a vertical cross-sectional view showing a high-temperature motor pump of a second embodiment of the present invention.

FIGS. 4 and 5 show a motor pump 1 of a second embodiment of the present invention. In this embodiment, the stator 32 and rotor 33 are cooled by a latent heat cooling process, which is more efficient than a sensible heat cooling process, by evaporating the coolant by the heat generated in the motor portion 3.

As shown in FIGS. 4 and 5, a coolant outlet hole 70 is provided on the motor casing 30 in the region close to the pump casing 43. Between the motor casing 30 and a separation plate 71 of the pump casing 30 is provided a seal 72. By such configuration, the vapor evaporated inside the motor casing 30 flows uniformly in the entire annular gap 34 and is exhausted from the coolant outlet 70 without flowing into the pump casing 43.

The coolant outlet 70 is connected to the coolant outlet line 73, in which a condenser 74 for condensing the vapor and a pressure reducing valve (not shown) positioned downstream the condenser 74 are provided. The condensed liquid is returned to the pump inlet line 60 after being adjusted of its pressure by the pressure reducing valve.

The auxiliary line 64 branched off from the pump outlet line 61 is connected to the coolant supply line 63 in series so that the pumped liquid is used as coolant. At the merge point of the auxiliary line 64 and the pump outlet line 61, a flow adjustment valve 75 for adjusting the flow rate of the liquid is provided. The coolant outlet line 73 has a thermometer 76 and a pressure gage 77 for respectively measuring the temperature and the pressure of the coolant flowing therein. The signals from the thermometer 76 and the pressure gage 77 are transmitted to a processor 78 for judging the state of the coolant, including whether the coolant is in a gaseous or liquidus state. After that, the processor 78 generates a signal to the flow adjustment valve 75 for adjusting the flow rate of the liquid flowing into the motor portion 3 so that the coolant is evaporated by the heat generated in the motor portion 3.

Through the above process, the coolant is prevented from flowing from the coolant outlet 70 without being evaporated in the motor portion 3. When the motor temperature is constant, it is possible to control the flow adjustment valve 75 only by the signal of the pressure gage 77.

According to the present embodiment, the high temperature liquid handled by the pump is used as a coolant, which flows through the annular gap 34 between the rotor 32 and the stator 33 to be evaporated. Thus, the coolant cools the motor effectively by a latent heat cooling process, which is more efficient than a sensible heat cooling process. And since the coolant is evaporated, the viscosity thereof is greatly reduced so that the friction loss due to the coolant is greatly decreased.

Although certain preferred embodiment of the present invention have been shown and described in detail, it should be understood that various changes and modifications may be made therein without departing from the scope of the appended claims.

What is claimed is:

1. A method of operating a motor pump including a pump portion for pumping a liquid, a motor portion for rotating said pump portion by way of a common rotation shaft and including a stator and a rotor, and a casing housing said pump portion and said motor portion, said method comprising:

providing a coolant to a gap between said stator and said rotor; and controlling the temperature of said coolant in said gap to be higher than a predetermined temperature necessary to maintain the viscosity of said coolant in said gap at a level to reduce frictional loss between said rotor and said stator.

2. A method as claimed in claim 1, wherein said predetermined temperature is lower than a maximum operating temperature of said motor portion and is a temperature at which a kinematic viscosity coefficient of said coolant is less than ⅓ of the kinematic viscosity coefficient of said coolant at room temperature.

3. A method as claimed in claim 1, wherein said predetermined temperature is higher than the evaporation temperature of said coolant.

4. A method as claimed in claim 1, wherein said coolant is of a material the same as said liquid.

5. A method as claimed in claim 1, wherein said coolant comprises a portion of said liquid.

6. A method as claimed in claim 1, wherein said controlling comprises adjusting the flow rate of said coolant into said gap.

7. A method as claimed in claim 1, wherein said controlling comprises adjusting the temperature of said coolant supplied to said gap.

8. A method as claimed in claim 7, further comprising detecting said temperature of said coolant in said gap by a sensor located at said gap and generating a signal representative of the detected temperature, and wherein said adjusting is in response to said signal.

9. A method as claimed in claim 1, further comprising cooling a part of said motor portion with said coolant, and then supplying said coolant into said gap.

10. A method as claimed in claim 9, wherein said cooling evaporates said coolant, and said supplying comprises passing said coolant in a gaseous state into said gap.

11. A method as claimed in claim 1, wherein said motor portion has spaces at opposite axial ends thereof, and further comprising circulating coolant between said spaces through a cooling pipe located outwardly of said casing, and cooling the thus circulating coolant.

12. A high-temperature pump comprising:

a pump portion for pumping a liquid;

a motor portion for driving said pump portion, said motor portion including a stator and a rotor with a gap therebetween;

a rotation shaft for transmitting rotation from said motor portion to said pump portion;

a casing housing said pump portion, said motor portion and said rotation shaft;

a coolant passage in said casing for flowing a coolant to said gap;

a temperature sensor for sensing temperature in said gap and for generating a signal representative thereof; and a controller receiving said signal and operable in response thereto to control the temperature of the coolant in said gap to be higher than a predetermined temperature necessary to maintain the viscosity of the coolant in said gap at a level to reduce frictional loss between said stator and said rotor.

13. A pump as claimed in claim 12, wherein said controller includes a valve for adjusting the flow rate of the coolant.

14. A pump as claimed in claim 12, wherein said controller includes a heat exchanger for adjusting the temperature of the coolant.

15. A pump as claimed in claim 12, wherein said predetermined temperature is lower than a maximum operating temperature of said motor portion and is a temperature at which a kinematic viscosity coefficient of the coolant is less than ⅓ of the kinematic viscosity coefficient of the coolant at room temperature.

16. A pump as claimed in claim 12, wherein said predetermined temperature is higher than the evaporation temperature of the coolant.

17. A pump as claimed in claim 12, further comprising a branch passage extending from a pump outlet to said coolant passage for supplying pumped liquid to said coolant passage as the coolant.

18. A pump as claimed in claim 12, wherein said motor portion has spaces at opposite axial ends thereof, and further comprising a cooling pipe extending between said spaces and located outwardly of said casing for circulating the coolant between said spaces.

19. A high-temperature pump comprising:
   a pump portion for pumping a liquid;
   a motor portion for driving said pump portion, said motor portion including a stator and a rotor with a gap therebetween;
   a rotation shaft for transmitting rotation from said motor portion to said pump portion;
   a casing housing said pump portion, said motor portion and said rotation shaft;
   a coolant passage in said casing for flowing a coolant to said gap;
   said casing having therein a stator housing portion including spaces housing opposite edge portions of stator coils; and
   a cooling pipe extending between said spaces and located outwardly of said casing for circulating the coolant directly between said spaces without passing the coolant through a heat exchanger.

20. A pump as claimed in claims 19, further comprising a controller operable to control the temperature of the coolant in said gap to be higher than a predetermined temperature necessary to maintain the viscosity of the coolant in said gap at a level to reduce frictional loss between said stator and said rotor.

21. A pump as claimed in claim 20, wherein said predetermined temperature is lower than a maximum operating temperature of said motor portion and is a temperature at which a kinematic viscosity coefficient of the coolant is less than ⅓ of the kinematic viscosity coefficient of the coolant at room temperature.

22. A pump as claimed in claim 20, wherein said predetermined temperature is higher than the evaporation temperature of the coolant.

23. A pump as claimed in claim 20, wherein said controller is operable to adjust the flow rate of the coolant in said gap.

24. A pump as claimed in claim 20, wherein said controller is operable to adjust the temperature of the coolant in said gap.

25. A pump as claimed in claim 19, further comprising a branch passage extending from a pump outlet to said coolant passage for supplying pumped liquid to said coolant passage as the coolant.

26. A high-temperature pump comprising:
   a pump portion for pumping a liquid;
   a motor portion for driving said pump portion, said motor portion including a stator and a rotor with a gap therebetween;
   a rotation shaft for transmitting rotation from said motor portion to said pump portion;
   a casing housing said pump portion, said motor portion and said rotation shaft;
   a coolant passage in said casing for flowing a coolant to said gap;
   a temperature sensor for sensing temperature in said gap and for generating a signal representative thereof;
   a controller receiving said signal and operable in response thereto to control at least one of the flow rate of the coolant and the temperature of the coolant;
   said motor portion having spaces at opposite axial ends thereof; and
   a cooling pipe extending between said spaces and located outwardly of said casing for circulating the coolant directly between said spaces without passing the coolant through a heat exchanger.

\* \* \* \* \*